United States Patent
Basso et al.

(10) Patent No.: US 11,966,752 B2
(45) Date of Patent: Apr. 23, 2024

(54) DATA CACHING FOR FAST SYSTEM BOOT-UP

(71) Applicant: Micron Technology, Inc., Boise, ID (US)

(72) Inventors: Francesco Basso, Portici (IT); Giuseppe Ferrari, Naples (IT); Francesco Falanga, Quarto (IT); Massimo Iaculo, San Marco Evangelista (IT)

(73) Assignee: Micron Technology, Inc., Boise, ID (US)

( * ) Notice: Subject to any disclaimer, the term of this patent is extended or adjusted under 35 U.S.C. 154(b) by 146 days.

(21) Appl. No.: 17/645,685

(22) Filed: Dec. 22, 2021

(65) Prior Publication Data
US 2023/0195474 A1  Jun. 22, 2023

(51) Int. Cl.
*G06F 9/44* (2018.01)
*G06F 9/4401* (2018.01)
*G06F 12/0871* (2016.01)

(52) U.S. Cl.
CPC ........ *G06F 9/4406* (2013.01); *G06F 12/0871* (2013.01)

(58) Field of Classification Search
None
See application file for complete search history.

(56) References Cited

U.S. PATENT DOCUMENTS

| | | | | |
|---|---|---|---|---|
| 9,207,947 B1* | 12/2015 | Murphy | ................ | G06F 21/575 |
| 10,025,598 B2* | 7/2018 | Chen | .................... | G06F 9/4406 |
| 11,416,263 B1* | 8/2022 | Sharon | ................. | G06F 9/4401 |
| 2021/0149800 A1* | 5/2021 | Yang | ................... | G06F 12/0246 |
| 2021/0373907 A1* | 12/2021 | Liang | .................... | G06F 9/4408 |

* cited by examiner

*Primary Examiner* — Fahmida Rahman
(74) *Attorney, Agent, or Firm* — Holland & Hart LLP

(57) ABSTRACT

Methods, systems, and devices for data caching for fast system boot-up are described. A memory system may create a linked mapping of addresses, which may also be referred to as a mixed page pointer table. The linked mapping may include logical addresses associated with commands received during a boot-up procedure, and their associated physical addresses. The linked mapping may also include a counter associated with each logical address to track how often the logical address is referenced during successive boot-up procedures. Over successive boot-up procedures, addresses may be added or removed from the linked mapping, and sequential addresses may be compressed. The memory device may use the linked mapping to predict which data may be accessed during the boot-up procedure, and may pre-transfer the data to volatile memory based on the prediction.

25 Claims, 6 Drawing Sheets

DATA CACHING FOR FAST SYSTEM BOOT-UP

FIELD OF TECHNOLOGY

The following relates generally to one or more systems for memory and more specifically to data caching for fast system boot-up.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Electronic devices (e.g., smartphones, laptops) may include systems that employ memory devices, such as a NOT-AND (NAND) device, that aid in one or more services performed by the systems. However, in some examples, a delay between powering on the electronic device (e.g., due to a user-initiated power-on) and other systems of the electronic device coming online may occur due at least in part to latency from the NAND device during a boot-up procedure. Accordingly, reducing the duration of the boot-up procedure (e.g., by reducing latency associated with the NAND device) may reduce latency from powering the system to other systems being online.

Systems, devices, and techniques are described herein for data caching for fast system boot-up. For example, the techniques described herein may enable a memory system to reduce the duration of successive boot-up procedures at a memory device. During a boot-up procedure, the memory system may implement a learning phase, which may include a data pre-fetch phase (e.g., data caching before receiving commands). For example, during the learning phase, a memory device may create a linked mapping of addresses, which may also be referred to as a mixed page pointer table (MPT). The linked mapping may include logical block addresses (LBAs) associated with the commands received during a boot-up procedure, and physical block addresses (PBAs) corresponding to each LBA. The linked mapping may also include a counter associated with each LBA to track how often the LBA is referenced during the boot-up procedure. In some examples, as the counts associated with each LBA change over time, LBAs may be added or removed from the linked mapping. In some examples, sequential addresses may be compressed at the linked mapping. During the data pre-fetch, the memory device may use the linked mapping to predict which PBAs may be accessed during the boot-up procedure (e.g., based on the linked mapping). By using and updating the linked mapping during successive boot-up procedures, the memory system may reduce the latency of subsequent boot-up procedures and improve a user's experience by reducing the total boot-up time of the electronic device.

Figure 1:
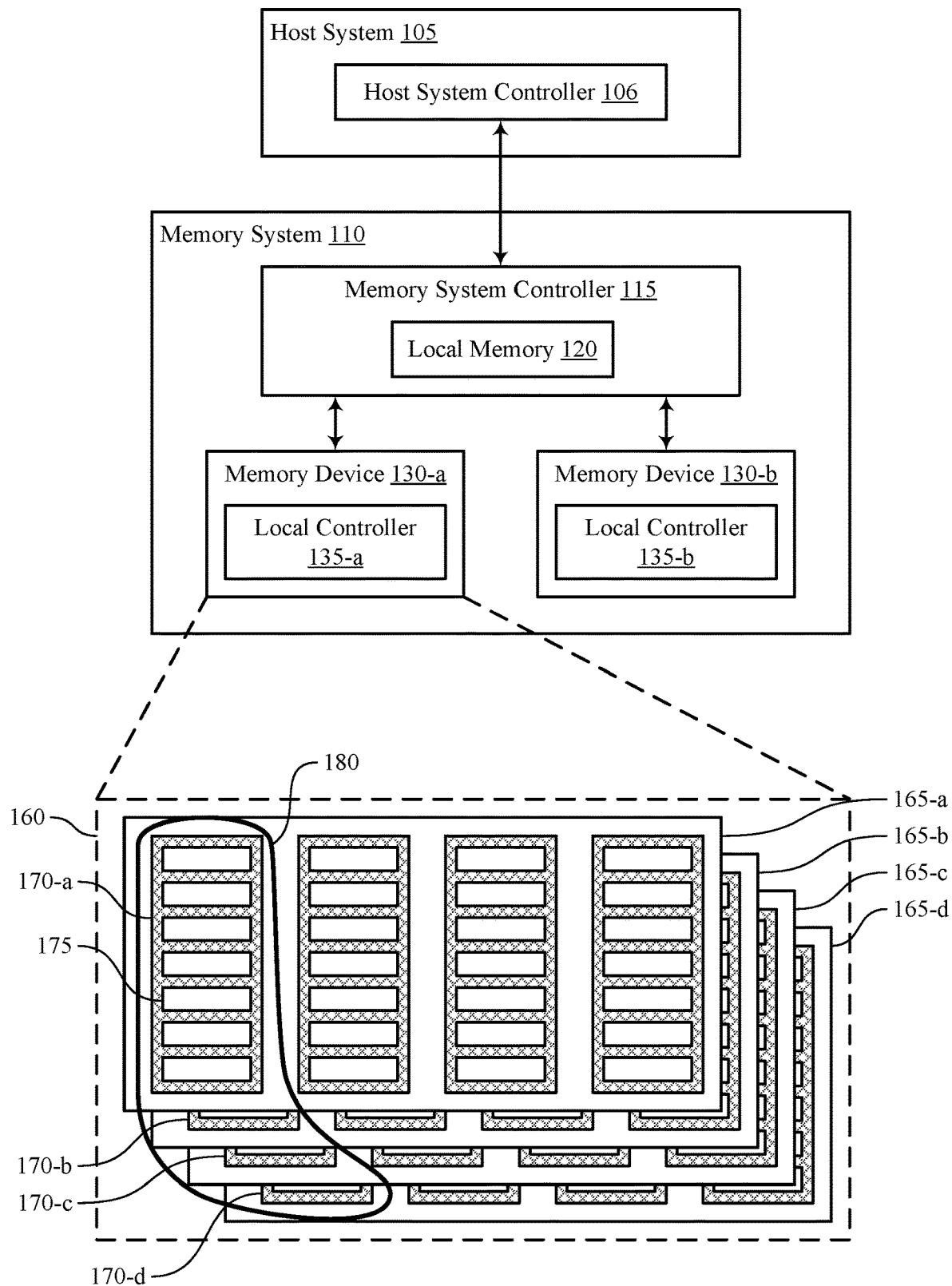
FIG. 1 illustrates an example of a system that supports data caching for fast system boot-up in accordance with examples as disclosed herein.

Features of the disclosure are initially described in the context of systems, devices, and circuits with reference to FIG. 1. Features of the disclosure are described in the context of a mapping, an MPT, and a process flow with reference to FIGS. 2-4. These and other features of the disclosure are further illustrated by and described in the context of an apparatus diagram and flowchart that relate to data caching for fast system boot-up with reference to FIGS. 5 and 6.

FIG. 1 illustrates an example of a system 100 that supports data caching for fast system boot-up in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., PBAs) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be a recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support data caching for fast system boot-up. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may support data caching for fast system boot-up. For example, the host system 105 may be an example of an electronic device that may initiate a boot-up of the memory system 110. During a boot-up, a memory device 130-a (e.g., which may be an example of non-volatile memory device, such as a NAND memory device) may generate a linked mapping (e.g., an MPT) to store LBAs, PBAs, counters, and compressed mapping information. For example, the MPT may have a data structure that consolidates information that may have been stored at multiple physical page tables (PPTs), which may be an example of an L2P mapping. In some examples, during successive boot-up procedures, the memory system 110 may use the linked mapping to pre-fetch data from a second memory device 130-b (e.g., which may be an example of a second NAND memory device) and transfer the data to a portion of volatile memory. By performing the pre-fetch operation (e.g., data caching before receiving commands) the memory system 110 may reduce the latency associated with performing access commands during boot-up procedures.

Figure 2:
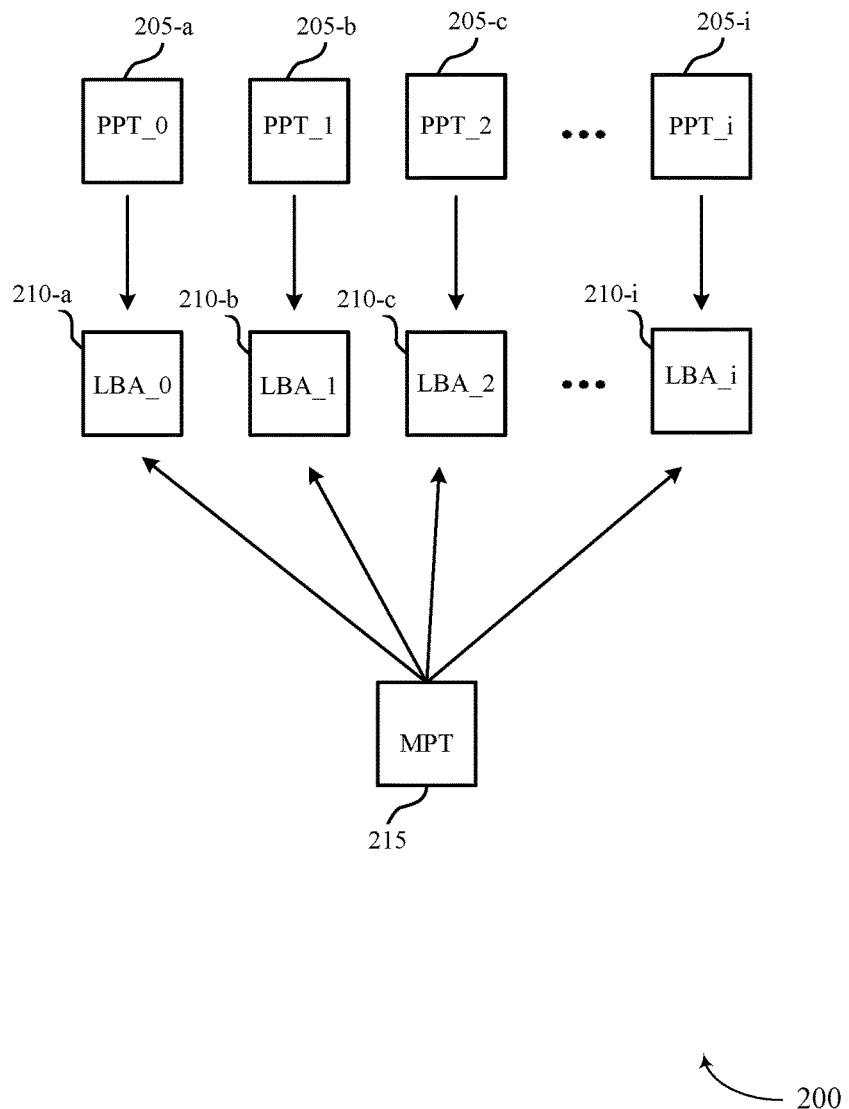
FIG. 2 illustrates an example of a mapping that supports data caching for fast system boot-up in accordance with examples as disclosed herein.

FIG. 2 illustrates an example of a mapping 200 that supports data caching for fast system boot-up in accordance with examples as disclosed herein. The mapping 200 may be an example of aspects of a memory system as described with reference to FIG. 1. The mapping 200 may include multiple PPTs 205 (e.g., the PPTs 205-a through 205-i), multiple LBAs 210 (e.g., the LBAs 210-a through 210-i), and an MPT 215. In some examples, a PPT 205 or MPT 215 may be stored at a memory system, such as a memory system 110 as described herein with reference to FIG. 1. In some examples, the LBAs 210-a through 210-i may be included in commands from a host system 105, as described herein with reference to FIG. 1. In some examples, the information within the PPTs 205 and MPT 215 may refer to physical addresses, which may be examples of dies, planes, and pages as described herein with reference to FIG. 1.

In some examples, the memory system may receive a command (e.g., as part of a boot-up procedure) from a host system to access data at an LBA. The memory system may access the data at a physical location (e.g., an associated PBA) and may store a correspondence between the LBA and the PBA in a PPT 205. In some examples, the memory system may use many PPTs (e.g., located at one or more memory devices) to map a set of LBAs 210 to their associated PBAs. During a boot-up procedure, for example, a host device at a memory system may send multiple access commands to a memory system, which may each be associated with different physical locations of memory. In some examples, it may increase latency at the memory system to access each of the PPTs 205 associated with a plurality of LBAs 210 to correspondingly access their associated PBAs. For example, during a boot-up procedure, a host device may send access commands including the LBAs 210-a and 210-c. In such an example, a memory device may individually access both the PPTs 205-a and 205-c to locate the PBAs associated with the received commands and proceed with the boot-up procedure. In some examples, a memory system may use multiple PPTs 205 for a single boot-up procedure.

A memory system may perform many boot-up procedures during its lifetime. For example, many electronic devices (e.g., a smartphone, a laptop) are regularly powered off and powered back on, or may go through other processes involving a boot-up of some systems at the electronic device. In some examples, each boot-up procedure may involve some similar access operations performed at a memory device of the memory system. For example, a host system may regularly send the same boot-up commands to a memory system for many successive boot-ups. In this example, the same boot-up commands may be associated with same LBAs 210 and same associated PBAs.

In some examples, the memory system may improve the latency of a boot-up procedure by using the single MPT 215, rather than the multiple PPTs 205. For example, the single MPT 215 may include mappings between the LBAs 210 and each of their associated PBAs. The MPT 215 may also include a counter associated with each LBA 210 to track how often each LBA 210 is referenced during a boot-up procedure. The MPT 215 may also be an adaptive list, based in part on the changing values of the counters. For example, LBAs 210 may be added or removed from the MPT 215 depending on how often they have been accessed during previous boot-up procedures. In some examples, the memory device may use the MPT 215 to pre-fetch data that may be included in a command. In some examples, the process of pre-fetching the data may be considered part of a learning phase associated with the boot-up procedure. By using the MPT 215 as part of boot-up procedures, the memory system may improve efficiency and latency by reducing the number of tables accessed during the boot-up procedures, and by enabling the memory system to track the addresses accessed during successive boot-up procedures.

Figure 3:
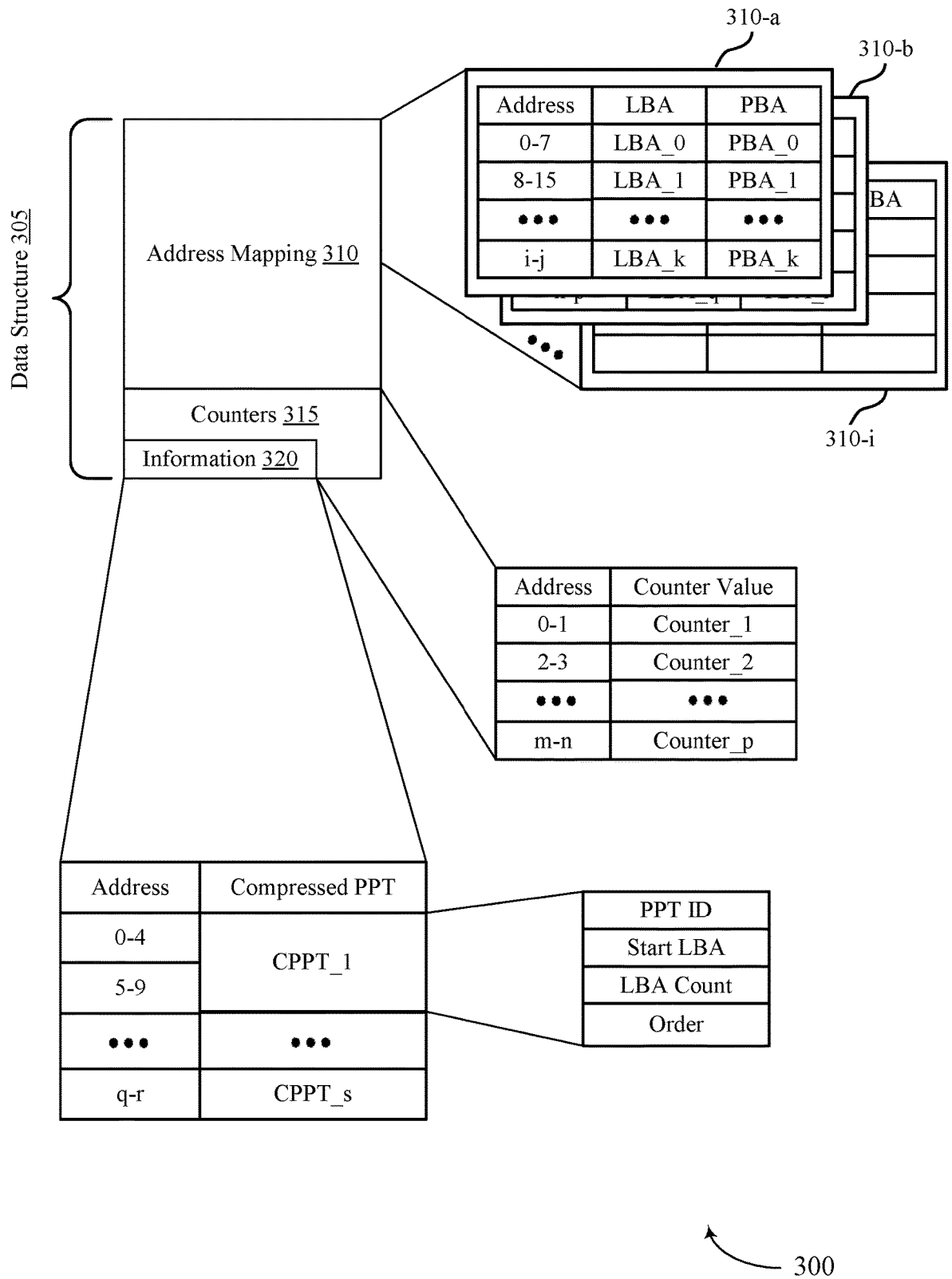
FIG. 3 illustrates an example of a mixed page pointer table that supports data caching for fast system boot-up in accordance with examples as disclosed herein.

FIG. 3 illustrates an example of an MPT 300 that supports data caching for fast system boot-up in accordance with examples as disclosed herein. The MPT 300 may be an example of aspects of a memory system as described with reference to FIGS. 1 and 2. For example, the MPT 300 may be an example of an MPT 215 as described with reference to FIG. 2. The MPT 300 may have a data structure 305 that may include the address mapping 310, the counters 315 associated with LBAs, and the information 320.

The data structure 305 of the MPT 300 may enable the memory system to track the addresses accessed during successive boot-operations and consolidate mapping information (e.g., logical-to-physical address mapping) at one or more mappings. For example, using the data structure 305 may reduce latency by reducing the number of information transfers between memory devices that may occur during boot-up procedures. The data structure 305, which may include the address mapping 310, the counters 315, and the information 320, may enable the memory system to store a dynamic linked mapping of addresses, a record of how often addresses are referenced during boot-up procedures, and a portion of compressed information, at one location in memory. In some examples, the consolidation of information at the data structure 305 may enable the memory system to more efficiently correlate the linked address mapping with a record of how frequently each address may be accessed, thus enabling the data pre-fetch during the learning phase. For example, during the data pre-fetch, the memory system may predict which addresses may be accessed by referring to the record of previous boot-up procedures, and may transfer information from a non-volatile memory device into volatile memory according to the prediction.

The address mapping 310 of the data structure 305 may be an example of an adaptive linked list of address mappings. In some examples, the address mapping 310 may include multiple pages of information (e.g., the address mappings 310-a through 310-i). In some examples, the address mapping 310 may be stored at a physical portion of memory, which may be an example of dies, planes, and pages as described herein with reference to FIG. 1. The address mapping 310 may include LBAs associated with commands received from a host system (e.g., as part of a boot-up procedure), and associated PBA. The associated PBAs may be located at one or more memory devices of the memory system, which may be the same or different as the memory device where the MPT 300 may be located. In some examples, the LBAs and their associated PBAs may be listed at an address (e.g., an index) within the address mapping 310. For example, at the page of address mappings 310-a, the first entry includes an LBA (e.g., the LBA_0) and a PBA (e.g., the PBA_0) associated with an index 0-7 of the address mapping 310.

The counters 315 may be an example of a dedicated portion of memory for storing counters associated with each LBA listed in the address mapping 310. For example, each of the LBAs listed at the address mapping 310-a (e.g., the LBAs 1 through k) may have an associated counter at the counters 315. The counters may each be stored at a smaller portion of memory (e.g., compared with the mapping between LBAs and PBAs at the address mapping 310). For example, at the counters 315, the first counter (e.g., the Counter 1) may be located at an address (e.g., indexed at 0-1) and may correspond to the LBA_0 in the address mapping 310. In some examples, a counter may be incremented each time the memory system receives a command that includes the associated LBA. Therefore, the counters 315 may provide an up-to-date record of the frequency of times each LBA may be accessed (e.g., during boot-up procedures).

The information 320 may be an example of a dedicated portion of memory for storing other information related to the address mapping 310 and the counters 315. In some examples, the information 320 may include a compressed mapping of the LBAs and PBAs that may be sequentially indexed. In some examples, the compressed mapping at the information 320 may be an example of a compressed PPT, which may be an example of an L2P mapping, among other information. In some examples, each compressed PPT (e.g., the CPPT_1) at the information 320 may have a substructure that may include: a PPT ID (e.g., an index), a start LBA (e.g., a listing of a first LBA in a list of sequentially-indexed LBAs at the address mapping 310), an LBA count (e.g., a number of LBAs in the list of sequentially-indexed LBAs), and an order (e.g., an order in the sequence of sequentially-indexed LBAs). The compressed PPT may have a data structure size of 10 bytes, and may include sequential addresses adding up to 10 total bytes of data. In some examples, the memory system may reference the information 320 as part of the boot-up procedures (e.g., in response to an access command from the host system including an LBA that may be sequentially-indexed).

In some examples, a memory system may experience a first boot-up (e.g., at a first user-initiated power-on), and the memory system may generate the MPT 300 before receiving a first command from a host device. For example, the memory system may create the data structure 305 to prepare to record information associated with the first boot-up. During the first boot-up, the memory system may fill the data structure 305 with information after receiving boot-up commands from the host system. For example, for each command from the host system, the memory system may add an associated LBA and a corresponding PBA to the address mapping 310. The memory system may also create a counter for each unique LBA, and may increment the counter at each repeated access operation associated with an LBA. In some examples, the memory system may compress the information into a compressed PPT at the information 320 in response to sequentially-indexed commands being received from the host system. By recording aspects of the commands received during the first boot-up procedure (e.g., the LBAs associated with each command and their associated PBAs, among other information) the memory system may improve efficiency and reduce latency at future boot-ups.

For example, during a subsequent boot-up, the memory system may use the information in the MPT 300 to reduce the latency of access operations associated with boot-up commands. A typical electronic device may perform many boot-up procedures, and each one may involve many similar access operations. For example, a host system may send commands associated with accessing the same LBAs at each boot-up procedure. The memory system may therefore use the MPT 300 after the first boot-up both to find an associated PBA to perform an access operation (e.g., using the address mapping 310) and to predict which LBAs and PBAs may be accessed as part of the boot-up procedure (e.g., according to the counter values in the MPT 300). For example, an LBA in the address mapping 310 with a high counter value at the counter 315 may be likely to be accessed again during the next boot-up procedure.

In some examples, during a subsequent boot-up, the memory system may implement a first phase (e.g., a learning phase), which may include pre-fetching data that may be accessed during the boot-up procedure. For example, the first phase may be characterized by transferring data from a non-volatile memory device to a volatile memory device (e.g., SRAM) using the address mapping 310. The first phase may also include updating the MPT 300 after receiving commands from the host system (e.g., during the host initialization phase of the boot-up procedure). In some examples, the first phase may be interrupted if the host system sends a write command during the boot-up procedure. During the first phase, the memory system may increment counters at the counter 315 after receiving access commands that may include a repeated LBA (e.g., an LBA that was previously included in a command during the same or a previous boot-up procedure). In some examples, during the first phase, the memory system may decrement a counter after not receiving a command associated with an LBA that was accessed during a previous boot-up procedure. In some examples, the memory system may decrement the counter by an amount greater than or equal to one, in some cases determined by applying a hysteresis (e.g., dependent on how many boot-ups have previously occurred). In some examples, the values of counters at the counters 315 may be used to update the address mapping 310.

In some examples, the memory system may add or remove addresses from the address mapping 310 by comparing the values of counters at the counters 315. For example, the address mapping 310 may be an adaptive linked list, in which new LBAs may be added to be more aligned with the commands associated with a recent host initialization phase of the boot-up procedure. In some examples, each entry of the address mapping 310 may be associated with a pointer (e.g., to map the LBAs to their corresponding PBAs). For example, the order in which LBAs are added to the address mapping 310 may determine which pointer and corresponding portion of physical memory they are mapped to. In some examples, after adding or removing LBAs from the linked list, the memory system may update the pointers to avoid mismatched or misordered logical and physical addresses due to reordering in the linked list.

The data structure 305 may occupy a dedicated portion of memory at a memory device, and may therefore have a finite amount of space dedicated to the address mapping 310. Once the address mapping 310 has been filled (e.g., after one or more boot-up procedures), the memory system may periodically remove addresses that have not been accessed in a while, and replace them with more recently or more frequently-accessed addresses. In some examples, the stored LBA sequence at the address mapping 310 may have a sequence length that may be considered sufficient (e.g., the memory system may choose not to add additional LBAs after a point) if it reaches a threshold value. For example, a threshold value may be associated with a tradeoff between a number of slots reserved for reading commands (e.g., sent during the host initialization phase of the boot-up procedure) and a number of reserved system pages (e.g., for access commands associated with other phases of the boot-up procedure). In some examples, the memory system may recognize sequentially-indexed sections of the LBA sequence at the address mapping 310 and may compress the sequentially-indexed portion at the information 320, thus freeing up more space at the address mapping 310.

For example, the memory system may determine, based on a value of the counter at the counters 315, to remove an entry from the address mapping 310. In some examples, the memory system may determine to perform the removal based on the value of the counter satisfying a threshold, or based on comparing a value of the counter to other counters, among other reasons. In some examples, the memory system may add a new address to the address mapping 310 after receiving a command from the host system that may include a new (e.g., not previously referenced) LBA.

By maintaining an up-to-date address mapping 310 and a compressed PPT in the information 320, the memory system may efficiently pre-fetch data before the host system sends a command as part of a boot-up procedure. The techniques described herein may enable the memory system to reduce latency of the boot-up procedure, an in particular of the first steps of the host initialization phase and the power-on initialization. Additionally, the MPT 300 may enable continual reduction in latency at each successive boot-up procedure.

Figure 4:
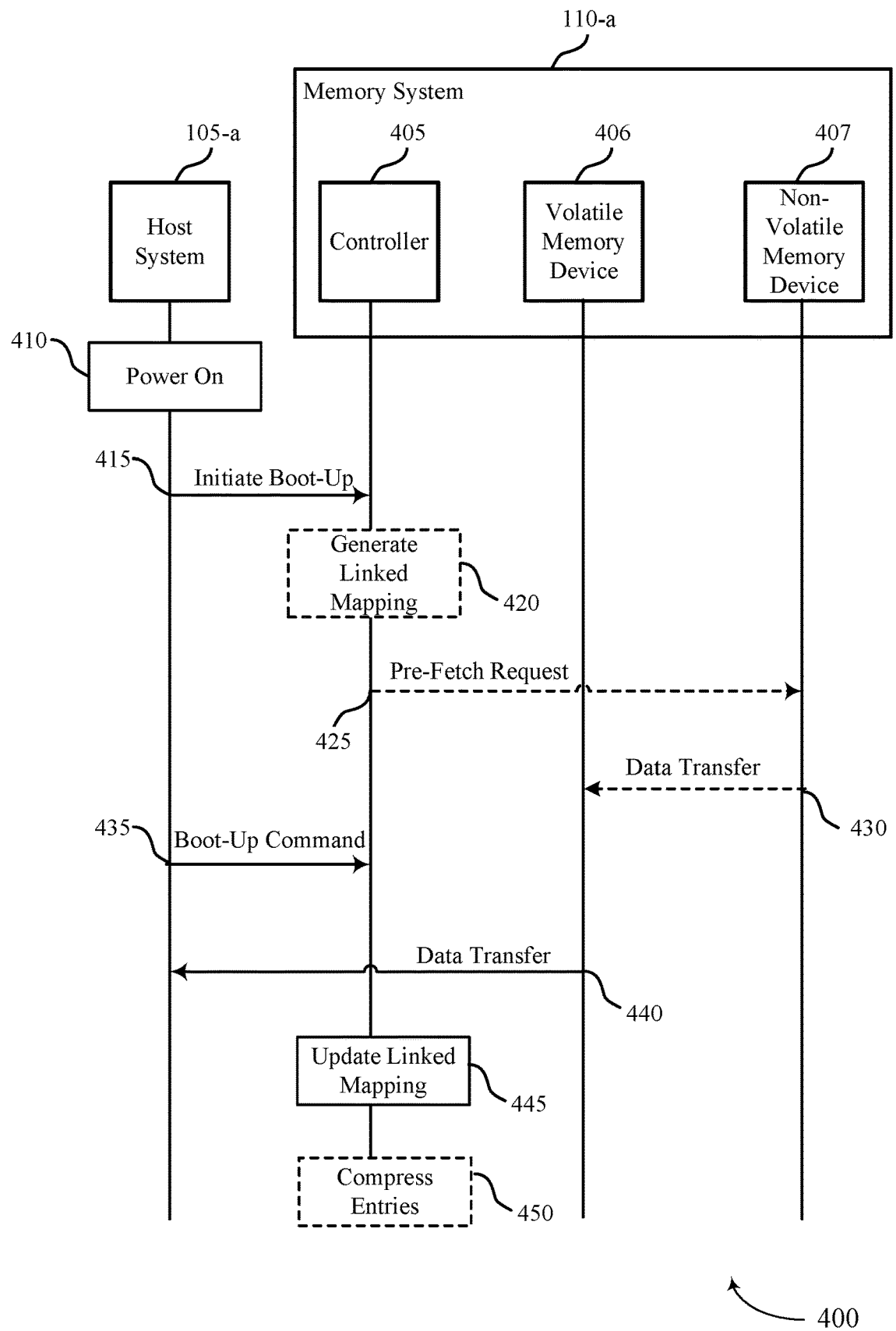
FIG. 4 illustrates an example of a process flow that supports data caching for fast system boot-up in accordance with examples as disclosed herein.

FIG. 4 illustrates an example of a process flow 400 that supports data caching for fast system boot-up in accordance with examples as disclosed herein. Process flow 400 may be implemented by one or more components of a memory system 110 as described with reference to FIG. 1. For example, aspects of the process flow 400 may be performed by or between a host system 105-a and a memory system 110-a, which may include a controller 405 (which may be an example of the memory system controller 115 described with reference to FIG. 1), a volatile memory device 406 (which may be an example of a local memory 120 or a memory device 130-b described with reference to FIG. 1), and a non-volatile memory device 407 (which may be an example of a memory device 130-a described with reference to FIG. 1).

At 410, the host system 105-a may initiate a power-on operation. In some examples, the host system 105-a may be an example of an electronic device (e.g., a smartphone, a laptop, another type of device), which may be powered on by a user (e.g., a user-initiated power-on). In some examples, a power-on may trigger a boot-up sequence at one or more memory systems associated with the host system 105-a. For example, at 415, the host system 105-a may initiate a boot-up procedure by transmitting a signal to the memory system 110-a.

In some examples, at 420, the memory system 110-a may generate a linked mapping (e.g., an MPT). In some examples, the linked mapping may be stored at the controller 405, the non-volatile memory device 407, or another memory device at the memory system 110-a. In some examples, the linked mapping may be an example of an MPT as described with reference to FIGS. 2 and 3. In some examples, the memory system 110-a may generate the linked mapping during a first boot-up initiated by the host system 105-a. The memory system 110-a may generate entries of the linked mapping based on access commands received from the host system 105-a (e.g., during a host initialization phase of the boot-up procedure). The linked mapping may persist at the memory system 110-a indefinitely (e.g., after subsequent power-offs and power-ons). As such, at subsequent boot-ups, the memory system 110-a may already have a linked mapping stored in memory and may proceed to 425.

In some examples, at 425, the controller 405 may transmit a pre-fetch request to the non-volatile memory device 407. For example, the non-volatile memory device 407 may be an example of NAND memory. In some examples, as described with reference to FIG. 3, the pre-fetch request may be based on the linked mapping, which may indicate portions of memory that may be likely to be accessed by the host system 105-a. In some examples, if the memory system 110-a is undergoing a first boot-up procedure, the linked mapping may not be filled (e.g., because the host system 105-a has not yet sent a boot-up command) and the controller 405 may not send the pre-fetch request. In some examples, at each subsequent boot-up procedure, the controller 405 may send an improved the pre-fetch request (e.g., due to the linked mapping including more information related to previous boot-up procedures). In some examples, at subsequent boot-ups, the controller 405 may increment a counter associated with each of the addresses that may be included in the pre-fetch request.

In some examples, at 430, the non-volatile memory device 407 may transfer data to the volatile memory device 406. In some examples, the volatile memory device 406 may be a portion of SRAM at the controller 405. In some examples, the volatile memory device 406 may transfer the data from physical addresses included in the pre-fetch request. The transferred data may include information associated with one or more logical addresses that may be included in a boot-up command from the host system 105-a. The logical addresses may be associated with the physical addresses via the linked mapping.

At 435, the host system 105-a may transmit a boot-up command to the memory system 110-a. For example, the boot-up command may be a read command. The boot-up command may be associated with a first boot-up procedure, such as a host initialization phase of the boot-up procedure. In some examples, the boot-up command may include one or more logical addresses (e.g., as part of a read command). In some examples (e.g., a cache hit scenario), the logical addresses included in the boot-up command may match the physical addresses included in the pre-fetch request (e.g., according to the linked mapping). In some examples (e.g., a cache miss scenario), the logical addresses included in the boot-up command may not match those associated with the pre-fetch request.

At 440, the volatile memory device 406 may transfer information to the host system 105-a. For example, the transferred information may be the information associated with the pre-fetch request. In some examples, by having pre-fetched the data, the memory system 110-a may perform the data transfer with reduced latency. In some examples, if the pre-fetch request did not occur (e.g., during a first boot-up), or if a cache miss occurs, the memory system 110-a may perform two data transfers (e.g., a first one from the non-volatile memory device 407 to the volatile memory device 406, and a second one from the volatile memory device 406 to the host system 105-a) which may increase latency.

At 445, the memory system 110-a may update the linked mapping. In some examples, the controller 405 may perform the update. For example, as described with reference to FIG. 3, in some examples the memory system 110-a may increment one or more counters associated with the LBAs included in the boot-up command at 435. In some examples, if a cache miss occurs, the memory system 110-a may decrement one or more counters associated with LBAs that were not included in the boot-up command at 435, but were included in a previous boot-up command. In some examples, as described with reference to FIG. 3, the memory system 110-a may add or remove an entry from the linked mapping to improve the accuracy of future pre-fetch requests. In some examples, the memory system 110-a may update pointers in the linked mapping to maintain an accurate mapping after entries have been added or removed.

In some examples, at 450, the memory system 110-a may compress entries of the linked mapping. For example, as described with reference to FIG. 3, the memory system 110-a may determine that a sequence of LBAs at the linked mapping may be sequentially-indexed. For such sequences of LBAs, the memory system 110-a may store the associated information at a compressed PPT within the linked mapping, thus improving the available space at the linked mapping. In such examples, the memory system 110-a may update pointers to maintain an accurate mapping after entries have been compressed.

In some examples, the memory system 110-a may repeat the steps 435 through 450 for each boot-up command that is part of a boot-up procedure. In some examples, the host system 105-a and the memory system 110-a may repeat the steps 410 through 450 for each subsequent boot-up procedure (e.g., after a subsequent power-on at the host system).

Figure 5:
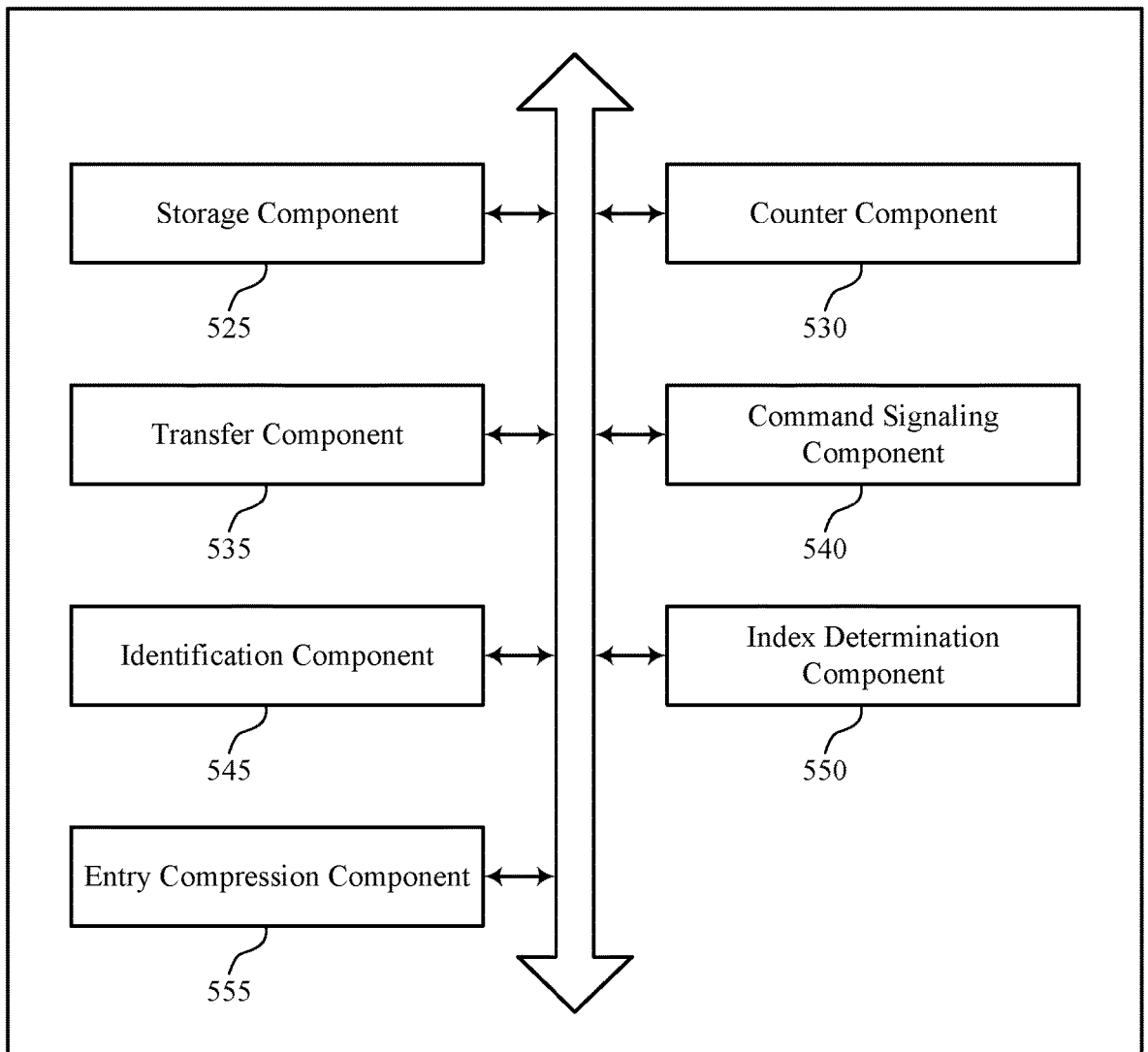
FIG. 5 shows a block diagram of a memory system that supports data caching for fast system boot-up in accordance with examples as disclosed herein.

FIG. 5 shows a block diagram 500 of a memory system 520 that supports data caching for fast system boot-up in accordance with examples as disclosed herein. The memory system 520 may be an example of aspects of a memory system as described with reference to FIGS. 1 through 4. The memory system 520, or various components thereof, may be an example of means for performing various aspects of data caching for fast system boot-up as described herein. For example, the memory system 520 may include a storage component 525, a counter component 530, a transfer component 535, a command signaling component 540, an identification component 545, an index determination component 550, an entry compression component 555, or any combination thereof. Each of these components may communicate, directly or indirectly, with one another (e.g., via one or more buses).

The storage component 525 may be configured as or otherwise support a means for storing, in a linked mapping, a sequence of logical addresses of a memory system that are accessed as part of a first boot-up procedure. The counter component 530 may be configured as or otherwise support a means for increment, in the linking mapping and as part of the first boot-up procedure, a first counter associated with a first logical address of the sequence of logical addresses and a second counter associated with a second logical address of the sequence of logical addresses. The transfer component 535 may be configured as or otherwise support a means for transfer, as part of a second boot-up procedure occurring after the first boot-up procedure, first information stored at the first logical address and second information stored at the second logical address from a non-volatile memory device to a volatile memory device based at least in part on the linked mapping. The command signaling component 540 may be configured as or otherwise support a means for receiving a command to access the first logical address as part of the second boot-up procedure. In some examples, the counter component 530 may be configured as or otherwise support a means for incrementing the first counter in the linked mapping based at least in part on receiving the command to access the first logical address.

In some examples, the memory system may receive a command to access a third logical address as part of the second boot-up procedure. In some examples, the memory system may add, to the linked mapping, the third logical address based at least in part on receiving the command. In some examples, the memory system may increment, in the linked mapping, a third counter associated with the third logical address based at least in part on receiving the command to access the third logical address.

In some examples, the memory system may update the linked mapping based at least in part on adding the third logical address to the sequence of logical addresses.

In some examples, the memory system may determine that the second logical address and the third logical address are indexed sequentially. In some examples, the memory system may compress one or more entries of the linked mapping associated with the second logical address and the third logical address, based on the second logical address and the third logical address being indexed sequentially.

In some examples, the memory system may generate an entry in a dedicated portion of the linked mapping that includes information for the first logical address, the second logical address, and the third logical address, the entry including a starting logical address and a count of sequentially indexed logical addresses for an access operation.

In some examples, the memory system may identify that the second logical address is not accessed as part of the second boot-up procedure. In some examples, the memory system may decrement the second counter based at least in part on the identifying.

In some examples, the memory system may determine that the second counter satisfies a threshold based at least in part on decrementing the second counter. In some examples, the memory system may remove, from the linked mapping, the second logical address of the sequence of logical addresses, based at least in part on determining that the second counter satisfies the threshold.

In some examples, the memory system may update the linked mapping based at least in part on removing the second logical address from the sequence of logical addresses.

In some examples, the linked mapping may be stored within a system block page at the memory system.

In some examples, the memory system may store a second sequence of logical addresses in a second linked mapping, based at least in part on a size of information associated with the first boot-up procedure and the second boot-up procedure.

In some examples, the storage component 525 may be configured as or otherwise support a means for storing, in a linked mapping, a sequence of logical addresses of a memory system that are accessed as part of a first boot-up procedure. In some examples, the counter component 530 may be configured as or otherwise support a means for incrementing, in the linked mapping and as part of the first boot-up procedure, a first counter associated with a first logical address of the sequence of logical addresses and a second counter associated with a second logical address of the sequence of logical addresses. In some examples, the transfer component 535 may be configured as or otherwise support a means for transferring, as part of a second boot-up procedure occurring after the first boot-up procedure, first information stored at the first logical address and second information stored at the second logical address from a non-volatile memory device to a volatile memory device based at least in part on the linked mapping. In some examples, the command signaling component 540 may be configured as or otherwise support a means for receiving a command to access the first logical address as part of the second boot-up procedure. In some examples, the counter component 530 may be configured as or otherwise support a means for incrementing the first counter in the linked mapping based at least in part on receiving the command to access the first logical address.

In some examples, the command signaling component 540 may be configured as or otherwise support a means for receiving a command to access a third logical address as part of the second boot-up procedure. In some examples, the storage component 525 may be configured as or otherwise support a means for adding, to the linked mapping, the third logical address based at least in part on receiving the command. In some examples, the counter component 530 may be configured as or otherwise support a means for incrementing, in the linked mapping, a third counter associated with the third logical address based at least in part on receiving the command to access the third logical address.

In some examples, the storage component 525 may be configured as or otherwise support a means for updating the linked mapping based at least in part on adding the third logical address to the sequence of logical addresses.

Figure 6:
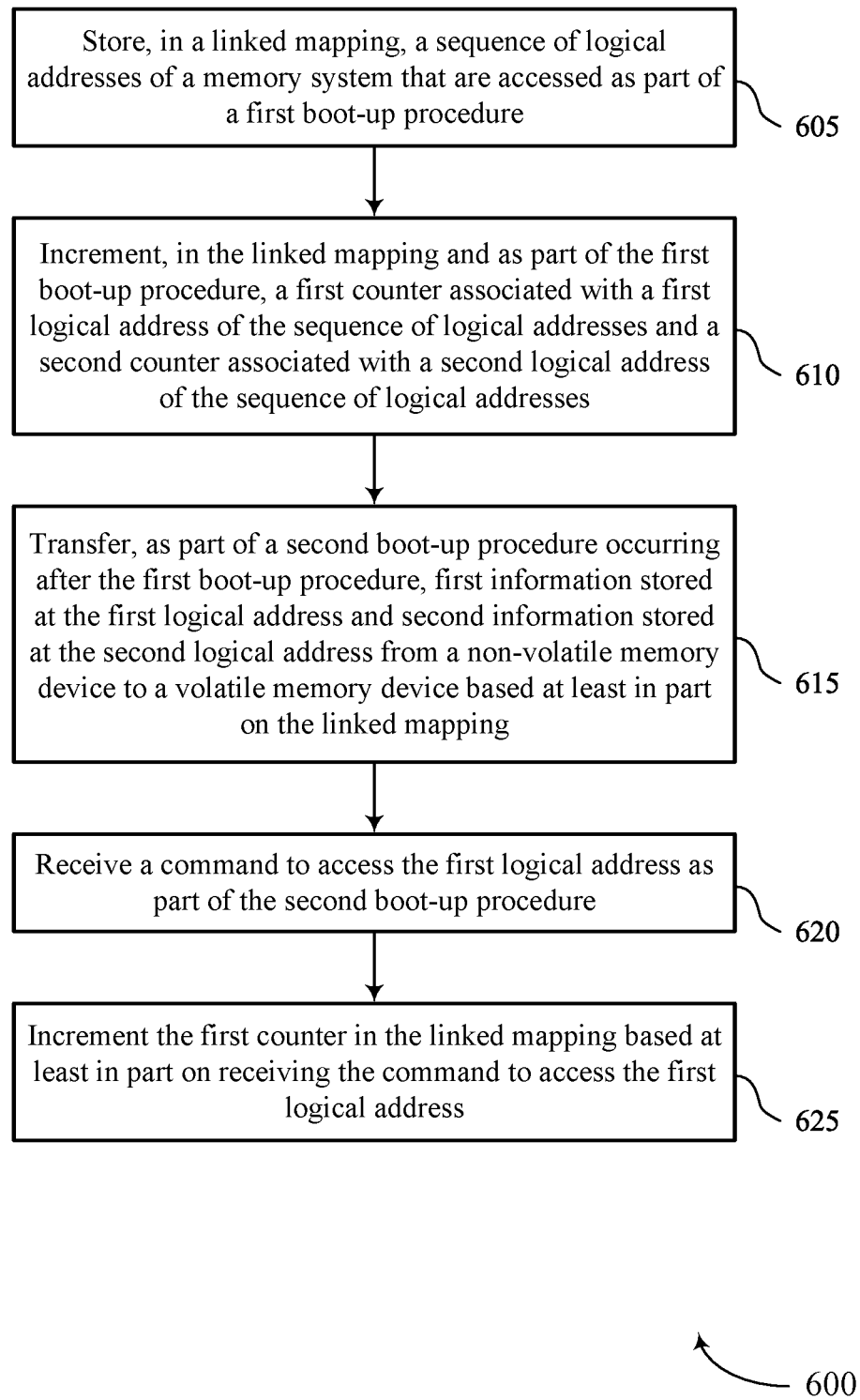
FIG. 6 shows a flowchart illustrating a method or methods that support data caching for fast system boot-up in accordance with examples as disclosed herein.

FIG. 6 shows a flowchart illustrating a method 600 that supports data caching for fast system boot-up in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include storing, in a linked mapping, a sequence of logical addresses of a memory system that are accessed as part of a first boot-up procedure. The operations of 605 may be performed in accordance with examples as disclosed herein. In some examples, aspects of the operations of 605 may be performed by a storage component 525 as described with reference to FIG. 5.

At 610, the method may include incrementing, in the linked mapping and as part of the first boot-up procedure, a first counter associated with a first logical address of the sequence of logical addresses and a second counter associated with a second logical address of the sequence of logical addresses. The operations of 610 may be performed in accordance with examples as disclosed herein. In some examples, aspects of the operations of 610 may be performed by a counter component 530 as described with reference to FIG. 5.

At 615, the method may include transferring, as part of a second boot-up procedure occurring after the first boot-up procedure, first information stored at the first logical address and second information stored at the second logical address from a non-volatile memory device to a volatile memory device based at least in part on the linked mapping. The operations of 615 may be performed in accordance with examples as disclosed herein. In some examples, aspects of the operations of 615 may be performed by a transfer component 535 as described with reference to FIG. 5.

At 620, the method may include receiving a command to access the first logical address as part of the second boot-up procedure. The operations of 620 may be performed in accordance with examples as disclosed herein. In some examples, aspects of the operations of 620 may be performed by a command signaling component 540 as described with reference to FIG. 5.

At 625, the method may include incrementing the first counter in the linked mapping based at least in part on receiving the command to access the first logical address. The operations of 625 may be performed in accordance with examples as disclosed herein. In some examples, aspects of the operations of 625 may be performed by a counter component 530 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor), or any combination thereof for performing the following aspects of the present disclosure:

Aspect 1: An apparatus, including: a memory system; and a controller coupled with the memory system and configured to cause the apparatus to: store, in a linked mapping, a sequence of logical addresses of the memory system that are accessed as part of a first boot-up procedure; increment, in the linked mapping and as part of the first boot-up procedure, a first counter associated with a first logical address of the sequence of logical addresses and a second counter associated with a second logical address of the sequence of logical addresses; transfer, as part of a second boot-up procedure occurring after the first boot-up procedure, first information stored at the first logical address and second information stored at the second logical address from a non-volatile memory device to a volatile memory device based at least in part on the linked mapping; receive a command to access the first logical address as part of the second boot-up procedure; and increment the first counter in the linked mapping based at least in part on receiving the command to access the first logical address.

Aspect 2: The apparatus of aspect 4, where the controller is further configured to cause the apparatus to: receive a command to access a third logical address as part of the second boot-up procedure; add, to the linked mapping, the third logical address based at least in part on receiving the command; and increment, in the linked mapping, a third counter associated with the third logical address based at least in part on receiving the command to access the third logical address.

Aspect 3: The apparatus of aspect 5, where the controller is further configured to cause the apparatus to: update the linked mapping based at least in part on adding the third logical address to the sequence of logical addresses.

Aspect 4: The apparatus of any of aspects 5 through 6, where the controller is further configured to cause the apparatus to: determine that the second logical address and the third logical address are indexed sequentially; compress one or more entries of the linked mapping associated with the second logical address and the third logical address, based on the second logical address and the third logical address being indexed sequentially.

Aspect 5: The apparatus of aspect 7, where compressing the one or more entries includes: generating an entry in a dedicated portion of the linked mapping that includes information for the first logical address, the second logical address, and the third logical address, the entry including a starting logical address and a count of sequentially indexed logical addresses for an access operation.

Aspect 6: The apparatus of any of aspects 4 through 8, further including: a plurality of counters, where each counter of the plurality is associated with a logical address of a plurality of logical addresses.

Aspect 7: The apparatus of any of aspects 4 through 9, where the controller is further configured to cause the apparatus to: identify that the second logical address is not accessed as part of the second boot-up procedure; decrement the second counter based at least in part on the identifying.

Aspect 8: The apparatus of aspect 10, where the controller is further configured to: determine that the second counter satisfies a threshold based at least in part on decrementing the second counter; and remove, from the linked mapping, the second logical address of the sequence of logical addresses, based at least in part on determining that the second counter satisfies the threshold.

Aspect 9: The apparatus of any of aspects 10 through 11, where the controller is further configured to: update the linked mapping based at least in part on removing the second logical address from the sequence of logical addresses.

Aspect 10: The apparatus of any of aspects 4 through 12, where the linked mapping is stored within a system block page at the memory system.

Aspect 11: The apparatus of any of aspects 4 through 13, where the linked mapping further includes a sequence of physical addresses, each physical address associated with a logical address of the sequence of logical addresses.

Aspect 12: The apparatus of any of aspects 4 through 14, where the controller is further configured to cause the apparatus to: store a second sequence of logical addresses in a second linked mapping, based at least in part on a size of information associated with the first boot-up procedure and the second boot-up procedure.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The terms "if," "when," "based on," or "based at least in part on" may be used interchangeably. In some examples, if the terms "if" "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
store, in a linked mapping, a sequence of logical addresses of the memory system that are accessed as part of a first boot-up procedure and a compressed mapping of logical addresses in a dedicated portion of the linked mapping, wherein the compressed mapping of logical addresses comprises information associated with two or more logical addresses that are indexed sequentially in the sequence of logical addresses;
increment, in the linked mapping and as part of the first boot-up procedure, a first counter associated with a first logical address of the sequence of logical addresses and a second counter associated with a second logical address of the sequence of logical addresses;
transfer, as part of a second boot-up procedure occurring after the first boot-up procedure, first information stored at the first logical address and second information stored at the second logical address from a non-volatile memory device to a volatile memory device based at least in part on the linked mapping;
receive a command to access the first logical address as part of the second boot-up procedure; and
increment the first counter in the linked mapping based at least in part on receiving the command to access the first logical address.

2. The memory system of claim 1, wherein the processing circuitry is further configured to cause the memory system to:
receive a second command to access a third logical address as part of the second boot-up procedure;
add, to the linked mapping, the third logical address based at least in part on receiving the second command; and
increment, in the linked mapping, a third counter associated with the third logical address based at least in part on receiving the second command to access the third logical address.

3. The memory system of claim 2, wherein the processing circuitry is further configured to cause the memory system to:
update the linked mapping based at least in part on adding the third logical address to the sequence of logical addresses.

4. The memory system of claim 2, wherein the processing circuitry is further configured to cause the memory system to:
determine that the second logical address and the third logical address are indexed sequentially; and
compress one or more entries of the linked mapping associated with the second logical address and the third logical address, based at least in part on the second logical address and the third logical address being indexed sequentially.

5. The memory system of claim 4, wherein, to compress the one or more entries, the processing circuitry is configured to cause the memory system to:

generate an entry in the compressed mapping of logical addresses that comprises information for the first logical address, the second logical address, and the third logical address, the entry comprising a starting logical address and a count of sequentially indexed logical addresses for an access operation.

6. The memory system of claim 1, further comprising:
a plurality of counters, wherein each counter of the plurality of counters is associated with a logical address of a plurality of logical addresses.

7. The memory system of claim 1, wherein the processing circuitry is further configured to cause the memory system to:
identify that the second logical address is not accessed as part of the second boot-up procedure; and
decrement the second counter based at least in part on the identifying.

8. The memory system of claim 7, wherein the processing circuitry is further configured to cause the memory system to:
determine that the second counter satisfies a threshold based at least in part on decrementing the second counter; and
remove, from the linked mapping, the second logical address of the sequence of logical addresses, based at least in part on determining that the second counter satisfies the threshold.

9. The memory system of claim 7, wherein the processing circuitry is further configured to cause the memory system to:
update the linked mapping based at least in part on removing the second logical address from the sequence of logical addresses.

10. The memory system of claim 1, wherein the linked mapping is stored within a system block page at the memory system.

11. The memory system of claim 1, wherein the linked mapping further comprises a sequence of physical addresses, each physical address associated with a logical address of the sequence of logical addresses.

12. A memory system, comprising:
one or more devices; and
processing circuitry coupled with the one or more memory devices and configured to cause the memory system to:
store, in a linked mapping, a sequence of logical addresses of the memory system that are accessed as part of a first boot-up procedure;
increment, in the linked mapping and as part of the first boot-up procedure, a first counter associated with a first logical address of the sequence of logical addresses and a second counter associated with a second logical address of the sequence of logical addresses;
transfer, as part of a second boot-up procedure occurring after the first boot-up procedure, first information stored at the first logical address and second information stored at the second logical address from a non-volatile memory device to a volatile memory device based at least in part on the linked mapping;
receive a command to access the first logical address as part of the second boot-up procedure;
increment the first counter in the linked mapping based at least in part on receiving the command to access the first logical address; and
store a second sequence of logical addresses in a second linked mapping, based at least in part on a size of information associated with the first boot-up procedure and the second boot-up procedure.

13. A non-transitory, computer-readable medium storing code comprising instructions which, when executed by one or more processors of an electronic device, cause the electronic device to:
store, in a linked mapping, a sequence of logical addresses of a memory system that are accessed as part of a first boot-up procedure and a compressed mapping of logical addresses in a dedicated portion of the linked mapping, wherein the compressed mapping of logical addresses comprises information associated with two or more logical addresses that are indexed sequentially in the sequence of logical addresses;
increment, in the linked mapping and as part of the first boot-up procedure, a first counter associated with a first logical address of the sequence of logical addresses and a second counter associated with a second logical address of the sequence of logical addresses;
transfer, as part of a second boot-up procedure occurring after the first boot-up procedure, first information stored at the first logical address and second information stored at the second logical address from a non-volatile memory device to a volatile memory device based at least in part on the linked mapping;
receive a command to access the first logical address as part of the second boot-up procedure; and
increment the first counter in the linked mapping based at least in part on receiving the command to access the first logical address.

14. The non-transitory, computer-readable medium of claim 13, wherein the instructions, when executed by the one or more processors of the electronic device, further cause the electronic device to:
receive a second command to access a third logical address as part of the second boot-up procedure;
add, to the linked mapping, the third logical address based at least in part on receiving the second command; and
increment, in the linked mapping, a third counter associated with the third logical address based at least in part on receiving the second command to access the third logical address.

15. The non-transitory, computer-readable medium of claim 14, wherein the instructions, when executed by the one or more processors of the electronic device, further cause the electronic device to:
update the linked mapping based at least in part on adding the third logical address to the sequence of logical addresses.

16. The non-transitory, computer-readable medium of claim 14, wherein the instructions, when executed by the one or more processors of the electronic device, further cause the electronic device to:
determine that the second logical address and the third logical address are indexed sequentially; and
compress one or more entries of the linked mapping associated with the second logical address and the third logical address, based at least in part on the second logical address and the third logical address being indexed sequentially.

17. The non-transitory, computer-readable medium of claim 16, wherein compressing the one or more entries comprises:
generating an entry in the compressed mapping of logical addresses that comprises information for the first logical address, the second logical address, and the third logical address, the entry comprising a starting logical address and a count of sequentially indexed logical addresses for an access operation.

18. The non-transitory, computer-readable medium of claim 13, wherein the instructions, when executed by the one or more processors of the electronic device, further cause the electronic device to:
identify that the second logical address is not accessed as part of the second boot-up procedure; and
decrement the second counter based at least in part on the identifying.

19. The non-transitory, computer-readable medium of claim 18, wherein the instructions, when executed by the one or more processors of the electronic device, further cause the electronic device to:
determine that the second counter satisfies a threshold based at least in part on decrementing the second counter; and
remove, from the linked mapping, the second logical address of the sequence of logical addresses, based at least in part on determining that the second counter satisfies the threshold.

20. The non-transitory, computer-readable medium of claim 18, wherein the instructions, when executed by the one or more processors of the electronic device, further cause the electronic device to:
update the linked mapping based at least in part on removing the second logical address from the sequence of logical addresses.

21. The non-transitory, computer-readable medium of claim 13, wherein the linked mapping is stored within a system block page at the memory system.

22. A non-transitory, computer-readable medium storing code comprising instructions which, when executed by one or more processors of an electronic device, cause the electronic device to:
store, in a linked mapping, a sequence of logical addresses of a memory system that are accessed as part of a first boot-up procedure;
increment, in the linked mapping and as part of the first boot-up procedure, a first counter associated with a first logical address of the sequence of logical addresses and a second counter associated with a second logical address of the sequence of logical addresses;
transfer, as part of a second boot-up procedure occurring after the first boot-up procedure, first information stored at the first logical address and second information stored at the second logical address from a non-volatile memory device to a volatile memory device based at least in part on the linked mapping;
receive a command to access the first logical address as part of the second boot-up procedure;
increment the first counter in the linked mapping based at least in part on receiving the command to access the first logical address; and
store a second sequence of logical addresses in a second linked mapping, based at least in part on a size of information associated with the first boot-up procedure and the second boot-up procedure.

23. A method, comprising:
storing, in a linked mapping, a sequence of logical addresses of a memory system that are accessed as part of a first boot-up procedure and a compressed mapping of logical addresses in a dedicated portion of the linked mapping, wherein the compressed mapping of logical addresses comprises information associated with two or more logical addresses that are indexed sequentially in the sequence of logical addresses;
incrementing, in the linked mapping and as part of the first boot-up procedure, a first counter associated with a first logical address of the sequence of logical addresses and a second counter associated with a second logical address of the sequence of logical addresses;
transferring, as part of a second boot-up procedure occurring after the first boot-up procedure, first information stored at the first logical address and second information stored at the second logical address from a non-volatile memory device to a volatile memory device based at least in part on the linked mapping;
receiving a command to access the first logical address as part of the second boot-up procedure; and
incrementing the first counter in the linked mapping based at least in part on receiving the command to access the first logical address.

24. The method of claim 23, further comprising:
receiving a second command to access a third logical address as part of the second boot-up procedure;
adding, to the linked mapping, the third logical address based at least in part on receiving the second command; and
incrementing, in the linked mapping, a third counter associated with the third logical address based at least in part on receiving the second command to access the third logical address.

25. The method of claim 24, further comprising:
updating the linked mapping based at least in part on adding the third logical address to the sequence of logical addresses.

* * * * *